(12) United States Patent
Dong et al.

(10) Patent No.: US 8,604,758 B1
(45) Date of Patent: Dec. 10, 2013

(54) CONTROL CIRCUIT FOR SWITCHING POWER SUPPLY

(75) Inventors: Jia-Qi Dong, Shenzhen (CN); Ji-Chao Li, Shenzhen (CN); Dan-Dan Liu, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/572,654

(22) Filed: Aug. 12, 2012

(30) Foreign Application Priority Data

Jun. 27, 2012 (CN) .................. 2012 1 02151632

(51) Int. Cl.
*G05F 1/00* (2006.01)
(52) U.S. Cl.
USPC .......................................... 323/271; 323/284
(58) Field of Classification Search
USPC .................. 323/222–225, 271–277, 280–286
See application file for complete search history.

(56) References Cited

U.S. PATENT DOCUMENTS

| 7,391,199 | B2* | 6/2008 | Akashi et al. | 323/285 |
| 7,839,112 | B2* | 11/2010 | Wei | 318/689 |
| 7,994,762 | B2* | 8/2011 | de Cremoux et al. | 323/271 |
| 2007/0018628 | A1* | 1/2007 | Akashi et al. | 323/284 |

* cited by examiner

*Primary Examiner* — Timothy J Dole
*Assistant Examiner* — Yusef Ahmed
(74) *Attorney, Agent, or Firm* — Altis Law Group, Inc.

(57) ABSTRACT

A control circuit includes a power controller, a comparator, and first to fifth electronic switches. When an electronic device is operating with light load, a voltage received by the inverting terminal of the comparator is less than a voltage received by the non-inverting terminal of the comparator, such that the first and fourth electronic switches are turned on, and the second, third, and fifth electronic switches are turned off. A first power supply is output to the switching power supply. When the electronic device is operating with heavy load, the voltage received by the inverting terminal of the comparator is greater than the voltage received by the non-inverting terminal of the comparator, such that the first and fourth electronic switches are turned off, and the second, third, and fifth electronic switches are turned on. A second power supply is output to the switching power supply.

9 Claims, 1 Drawing Sheet

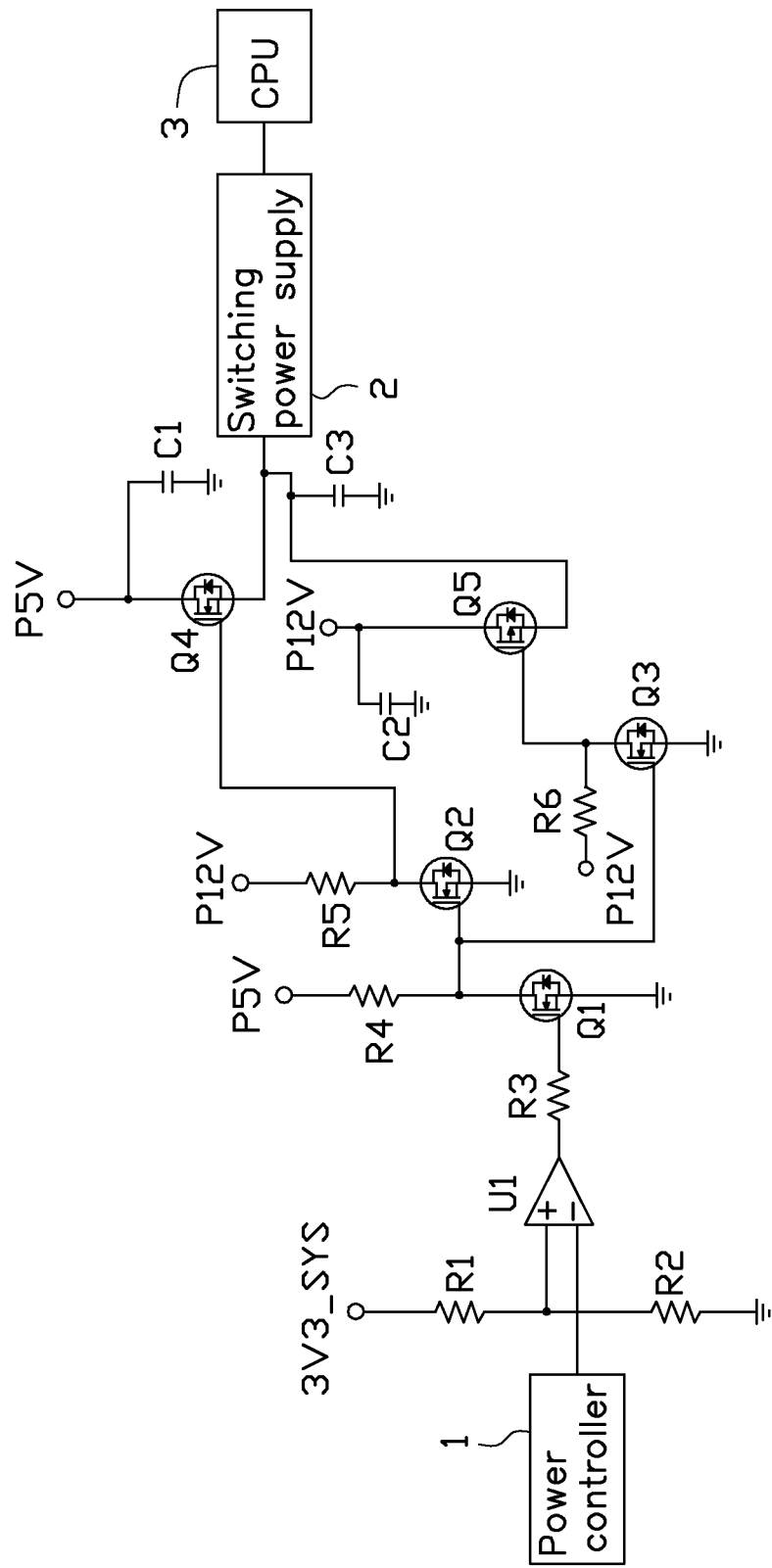

CONTROL CIRCUIT FOR SWITCHING POWER SUPPLY

BACKGROUND

1. Technical Field

The present disclosure relates to a circuit for controlling a driving voltage of a switching power supply.

2. Description of Related Art

Switching power supplies use 5 volts or 12 volts for driving field effect transistors (FETs). In detail, 5 volts is for driving the FETs in a switching power supply with single phase, and 12 volts is for driving the FETs in a switching power supply with multi-phases. However, when the switching power supply with multi-phases is working with light load, the FETs are driven by 12 volts, which consumes energy.

BRIEF DESCRIPTION OF THE DRAWING

Many aspects of the embodiments can be better understood with reference to the following drawing. The components in the drawing are not necessarily drawn to scale, the emphasis instead being placed upon clearly illustrating the principles of the present embodiments. Moreover, in the drawing, like reference numerals designate corresponding parts throughout the several views.

The FIGURE is a circuit diagram of an exemplary embodiment of a control circuit.

DETAILED DESCRIPTION

The disclosure, including the accompanying drawing, is illustrated by way of examples and not by way of limitation. It should be noted that references to "an" or "one" embodiment in this disclosure are not necessarily to the same embodiment, and such references mean at least one.

Referring to the FIGURE, an exemplary embodiment of a control circuit is shown. The control circuit is for controlling the driving voltage of a switching power supply 2 for powering an electronic device, such as a central processing unit (CPU) 3. The control circuit includes a comparator U1, five electronic switches, and a power controller 1. In the embodiment, the five electronic switches include five field-effect transistors (FETs) Q1-Q5. The FETs Q1-Q4 are n-channel FETs, and the FET Q5 is a p-channel FET.

An inverting terminal of the comparator U1 is connected to an output terminal of the power controller 1. In the embodiment, the power controller 1 measures current flowing from the switching power supply 2, and converts the current to a voltage value. The voltage value stands for a working status of the CPU 3. In other words, it can be determined that the CPU 3 is operating with light load or heavy load by the voltage value. A non-inverting terminal of the comparator U1 is connected to a system power 3V3_SYS through a resistor R1. The non-inverting terminal of the comparator U1 is further grounded through a resistor R2.

An output terminal of the comparator U1 is connected to a gate of the FET Q1 through a resistor R3. A source of the FET Q1 is grounded. A drain of the FET Q1 is connected to a system power P5V through a resistor R4. The drain of the FET Q1 is further connected to gates of the FETs Q2 and Q3. Sources of the FETs Q2 and Q3 are grounded. A drain of the FET Q2 is connected to a system power P12V through a resistor R5. The drain of the FET Q2 is further connected to a gate of the FET Q4.

A drain of the FET Q3 is connected to the system power P12V through a resistor R6. The drain of the FET Q3 is further connected to a gate of the FET Q5. A drain of the FET Q4 is connected to the system power P5V. A drain of the FET Q5 is connected to the system power P12V. The drain of the FET Q4 is further grounded through a capacitor C1. The drain of the FET Q5 is further grounded through a capacitor C2. Sources of the FETs Q4 and Q5 are grounded through a capacitor C3. The sources of the FETs Q4 and Q5 are further connected to the switching power supply 2.

The manner of operation of the control circuit is as follows.

When the CPU 3 is operating with full load, the power controller 1 measures the current flowing from the switching power supply 2, and converts the current to the voltage value Vimon. According to characters of switching power supplies, when the CPU 3 is operating with light load, such as less than 40%, the 5 volts from the system power P5V can drive the switching power supply 2. When the CPU 3 is operating with heavy load, such as higher than 50%, the 12 volts from the system power P12V can drive the switching power supply 2. As a result, in the embodiment, resistances of the resistors R1 and R2 are set to make a voltage received by the non-inverting terminal of the comparator U1 equal to 0.5*Vimon.

When the CPU 3 is operating with light load, a voltage received by the inverting terminal is less than a voltage received by the non-inverting terminal of the comparator U1, such that the output terminal of the comparator U1 outputs a signal with high level. The FETs Q1 and Q4 are turned on. The FETs Q2, Q3, and Q5 are turned off. The system P5V is output to the switching power supply 2 through the FET Q4.

When the CPU 3 is operating with heavy load, a voltage received by the inverting terminal is greater than a voltage received by the non-inverting terminal of the comparator U1, such that the output terminal of the comparator U1 outputs a signal with low level. The FETs Q1 and Q4 are turned off. The FETs Q2, Q3, and Q5 are turned on. The system P12V is output to the switching power supply 2 through the FET Q5.

In the embodiment, the FETs Q1-Q5 function as electronic switches.

The foregoing description of the exemplary embodiments of the disclosure has been presented only for the purposes of illustration and description and is not intended to be exhaustive or to limit the disclosure to the precise forms disclosed. Many modifications and variations are possible in the light of everything above. The embodiments were chosen and described in order to explain the principles of the disclosure and their practical application so as to enable others of ordinary skill in the art to utilize the disclosure and various embodiments with various modifications as are suited to the particular use contemplated. Alternative embodiments will become apparent to those of ordinary skills in the art to which the present disclosure pertains without departing from its spirit and scope. Accordingly, the scope of the present disclosure is defined by the appended claims rather than the foregoing description and the exemplary embodiments described therein.

What is claimed is:

1. A control circuit for a switching power supply of an electronic device, comprising:

a power controller measuring a current flowing from the switching power supply, and converting the current to a voltage, for indicating working status of the electronic device;

a comparator comprising an inverting terminal receiving the voltage from the power controller, and a non-inverting terminal connected to a reference voltage;

a first electronic switch comprising a control terminal connected to an output terminal of the comparator, a first terminal connected to a first power supply through a first resistor, and a second terminal grounded;

a second electronic switch comprising a control terminal connected to the first terminal of the first electronic switch, a first terminal connected to a second power supply through a second resistor, and a second terminal grounded;

a third electronic switch comprising a control terminal connected to the first terminal of the first electronic switch, a first terminal connected to the second power supply through a third resistor, and a second terminal grounded;

a fourth electronic switch comprising a control terminal connected to the first terminal of the second electronic switch, a first terminal connected to the first power supply, and a second terminal connected to the switching power supply; and a fifth electronic switch comprising a control terminal connected to the first terminal of the third electronic switch, a first terminal connected to the second power supply, and a second terminal connected to the switching power supply;

wherein when the electronic device is operating with light load, a voltage received by the inverting terminal of the comparator is less than a voltage received by the non-inverting terminal of the comparator, such that the output terminal of the comparator outputs a signal with a high level, the first and fourth electronic switches are turned on, and the second, third, and fifth electronic switches are turned off, the first power supply is outputted to the switching power supply; and wherein when the electronic device is operating with heavy load, the voltage received by the inverting terminal of the comparator is greater than the voltage received by the non-inverting terminal of the comparator, such that the output terminal of the comparator outputs a signal with a low level, the first and fourth electronic switches are turned off, and the second, third, and fifth electronic switches are turned on, the second power supply is outputted to the switching power supply.

2. The control circuit of claim 1, wherein the reference voltage is provided by a third power supply, fourth and fifth resistors; the third power supply is grounded through the fourth and fifth resistors connected in series, a node between the fourth and fifth resistors is connected to the non-inverting terminal of the comparator.

3. The control circuit of claim 1, wherein the first terminal of the fourth electronic switch is further grounded through a first capacitor, the first terminal of the fifth electronic switch is further grounded through a second capacitor.

4. The control circuit of claim 1, wherein the second terminals of the fourth and fifth electronic switches are further grounded through a third capacitor.

5. The control circuit of claim 1, wherein the first electronic switch is an n-channel field-effect transistor (FET), the control terminal of the first electronic switch is a gate of the n-channel FET, the first terminal of the first electronic switch is a drain of the n-channel FET, and the second terminal of the first electronic switch is a source of the n-channel FET.

6. The control circuit of claim 1, wherein the second electronic switch is an n-channel FET, the control terminal of the second electronic switch is a gate of the n-channel FET, the first terminal of the second electronic switch is a drain of the n-channel FET, and the second terminal of the second electronic switch is a source of the n-channel FET.

7. The control circuit of claim 1, wherein the third electronic switch is an n-channel FET, the control terminal of the third electronic switch is a gate of the n-channel FET, the first terminal of the third electronic switch is a drain of the n-channel FET, and the second terminal of the third electronic switch is a source of the n-channel FET.

8. The control circuit of claim 1, wherein the fourth electronic switch is an n-channel FET, the control terminal of the fourth electronic switch is a gate of the n-channel FET, the first terminal of the fourth electronic switch is a drain of the n-channel FET, and the second terminal of the fourth electronic switch is a source of the n-channel FET.

9. The control circuit of claim 1, wherein the fifth electronic switch is a p-channel FET, the control terminal of the fourth electronic switch is a gate of the p-channel FET, the first terminal of the fourth electronic switch is a drain of the p-channel FET, and the second terminal of the fourth electronic switch is a source of the p-channel FET.

\* \* \* \* \*